(12) United States Patent
Martin et al.

(10) Patent No.: US 6,640,413 B1
(45) Date of Patent: Nov. 4, 2003

(54) METHOD OF MAKING A HUNTING DECOY

(76) Inventors: James Robert Martin, deceased, late of Beaver Dam, WI (US); By Mary L. Schreiber, 143 Vermont St., Beaver Dam, WI (US) 53916; By Theresa Ann Martin, 143 Vermont St., Beaver Dam, WI (US) 53916

(*) Notice: Subject to any disclaimer, the term of this patent is extended or adjusted under 35 U.S.C. 154(b) by 0 days.

(21) Appl. No.: 09/512,544

(22) Filed: Feb. 24, 2000

Related U.S. Application Data

(60) Continuation-in-part of application No. 08/948,561, filed on Oct. 10, 1997, now abandoned, which is a division of application No. 08/753,325, filed on Nov. 21, 1996, now abandoned.

(51) Int. Cl.⁷ .......................... B23P 11/00; B29C 39/00; A01M 31/06
(52) U.S. Cl. ................ 29/525.01; 264/46.8; 264/271.1; 264/553; 43/2; 43/3
(58) Field of Search ................ 29/525.01; 264/552, 264/553, 259, 271.1, 322, 46.8, 571; 43/2, 3; 156/285

(56) References Cited

U.S. PATENT DOCUMENTS

| | | | |
|---|---|---|---|
| 282,851 A | 8/1883 | Danz, Jr. | |
| 364,573 A | 6/1887 | Brinkop | |
| 1,663,009 A | 3/1928 | Johnson | |
| 1,732,316 A | 10/1929 | Scott | ................ 43/3 |
| 2,011,480 A | 8/1935 | Gazalski et al. | |
| 2,453,758 A | 11/1948 | Risch | |
| 2,719,376 A | 10/1955 | Risch | ................ 43/3 |
| 2,746,196 A | 5/1956 | Karr | |
| 2,763,952 A | 9/1956 | Bruce | |
| 2,806,812 A | * 9/1957 | Merz | ............ 264/46.8 |
| 2,880,544 A | 4/1959 | Crummer et al. | ................ 43/3 |
| 2,893,154 A | 7/1959 | McKee | ............ 43/3 |
| 3,029,541 A | 4/1962 | Palmer | |
| 3,468,996 A | 9/1969 | Odell | ............ 264/45 |
| 3,703,572 A | * 11/1972 | Bellasalma | ............ 264/46.8 |
| 3,707,798 A | 1/1973 | Tryon | |
| 3,935,044 A | 1/1976 | Daly | ............ 264/45.4 |
| 4,450,642 A | 5/1984 | DeKezel et al. | ................ 43/3 |
| 4,519,964 A | 5/1985 | Rosen | ............ 264/45.4 |
| 4,691,464 A | 9/1987 | Rudolph | ................ 43/3 |
| 4,798,549 A | 1/1989 | Hirsch | ............ 264/45.4 |
| 4,829,695 A | 5/1989 | Hoecherl | ................ 43/3 |
| 4,845,872 A | 7/1989 | Anderson | |
| 4,885,861 A | 12/1989 | Gazalski | |
| 4,890,408 A | 1/1990 | Heiges et al. | ................ 43/3 |
| 5,073,444 A | 12/1991 | Shanelec | ............ 428/313.5 |
| 5,284,173 A | 2/1994 | Graves et al. | |
| 5,293,709 A | 3/1994 | Cripe | |
| 5,572,824 A | 11/1996 | Szolis | ................ 43/3 |
| 6,115,953 A | 9/2000 | Wise | |

FOREIGN PATENT DOCUMENTS

GB     2247819     3/1992

* cited by examiner

*Primary Examiner*—P. W. Echols
(74) *Attorney, Agent, or Firm*—Bachman & LaPointe, P.C.

(57) ABSTRACT

An improved hunting decoy is made by securing an outer skin around a buoyant core. A buoyant core body is formed from buoyant core material into a shape approximating that of a desired animal. The core body may include a head or be headless. After the buoyant core body has been formed in the desired shape, a rigid outer skin is secured about the buoyant core body. Securing the outer skin is accomplished by vacuum-forming a sheet of deformable material about the buoyant core body.

25 Claims, 2 Drawing Sheets

METHOD OF MAKING A HUNTING DECOY

This is a continuation-in-part application of U.S. patent application Ser. No. 08/948,561, filed Oct. 10, 1997 noe abandoned, a divisional application of U.S. patent application Ser. No. 08/753,325, filed on Nov. 21, 1996 now abandoned, which are incorporated herein in full by reference.

FIELD OF THE INVENTION

This invention relates generally to hunting decoys, and pertains more specifically to methods of making hunting decoys by vacuum-forming an outer skin around a buoyant core.

BACKGROUND OF THE INVENTION

Hunters often use decoys of a particular prey to entice or lure the actual prey toward the hunters. Hunters have come to appreciate that the more realistic the appearance of a decoy, for example, a duck or other water fowl decoy, the more likely that a living like animal will be attracted to the decoy. As such, it is important that hunting decoys be manufactured to simulate the likeness of a desired animal.

To be most effective in use, a decoy should give the appearance of real-life animals, have strength and durability to withstand extreme elements, such as sunlight and cold temperatures, of repeated outdoor use, transport, and storage, be conveniently transported, and be stored in a limited amount of space, while being relatively simple and inexpensive to produce. For water fowl decoys, the decoys must readily float and be supported in a movable and substantially upright, balanced position, so that they may be freely acted upon by movements of the water or by the wind, and thereby more closely imitate realistic flotation characteristics and movements of a particular species.

In the case of hunting duck, or other water fowl, a string of decoys may be floated in a body of water. One potential problem with such decoys is that they, may lie in the line of fire and be inadvertently struck by gun shot. In addition to suffering cosmetic damage, many prior art decoys are rendered useless after being struck by only a few stray gun shot. For example, when hollow, sealed shell decoys are hit by gun shot, they may no longer remain buoyant. When foam decoys are hit by gun shot, they may be obliterated. Thus, a need exists for a decoy which is sufficiently durable to sustain hits by stray gun shot and is still relatively simple and cost effective to manufacture.

Various types of decoys have been manufactured, including full body decoys and half shell, silhouette, cardboard or plastic A-frame, wind sock, and rag decoys, among others. The method of making an improved decoy of the present invention pertains to foam body decoys.

Full body decoys in the prior art are typically manufactured through a "blow-molding" process, in which a whole body decoy is blow-molded, a hole is then drilled in the body, and a filler, such as foam, is finally injected into the body. For example, U.S. Pat. No. 4,450,642 to DeKezel et al. discloses a method of making a decoy including the steps of forming a rigid outer shell, and then injection molding a buoyant plastic material into the shell. A disadvantage of the blow-molding or injection-molding process is that access to or through the interior of the resulting decoy shell is not readily available for filling with buoyant material or for installment of a keel weight, ballast mechanism, or means for connecting a series of decoys together. A hole must be drilled in the decoy shell in order to inject filler material. Generally, another access must be separately created in order to install a keel weight, ballast mechanism, or means for connecting decoys together underwater.

SUMMARY OF THE INVENTION

The method of the present invention utilizes a heat-bonding process wherein a sheet of deformable material is heated to the point of elastically deforming and then vacuum-formed about a pre-formed buoyant core body. The sheet of material may be formed about the top portion of the core body, leaving the bottom uncovered, which is advantageous for installing a keel weight or a means for stringing decoys together through the bottom opening.

The sheet of material used in forming the outer skin needs to be sufficiently deformable to become elastic when heated in the manufacturing process in order to collapse and re-form about the buoyant core bodies. Yet the sheet of deformable material needs to also become rigid enough when cooled to provide strength and durability in outdoor use, transportation, and storage.

The rigid outer skin formed by the method of the present invention provides the advantage of being resistant to damage from outdoor elements, and is durable in repeated use, transportation, and storage. The rigid outer skin made by the method of the present invention, in combination with the buoyant core body, gives the appearance of full-bodied animals, produces a decoy that is fully floatable, and requires no further waterproofing, such as with canvas or rubber material or tar. An additional advantage of the rigid outer skin formed about a buoyant core body by the method of the present invention is that the resulting decoy is able to maintain an outer skin integrity and buoyancy even when hit by gun shot.

An advantage of the present invention is that the present invention provides an improved method of making a hunting decoy that reduces or eliminates the disadvantages of current methods of manufacture and to provide hunting decoys with advantageous characteristics.

Another advantage of the present invention is that the present invention provides an improved method of making a hunting decoy that has a buoyant core body.

A further advantage of the present invention provides an improved method of making a hunting decoy that has enhanced tensile strength, flotation and storage stability, and durability of use due to a rigid outer skin.

A still further advantage of the present invention is to provide an improved method of making a hunting decoy utilizing the process of vacuum-forming a sheet of deformable material about a buoyant core body.

Other advantages of the present invention will be apparent to those of ordinary skill in the art of the present invention.

The present invention provides a method for producing a hunting decoy. In a first aspect a method of the present invention comprises: (1) forming a buoyant core body in a shape approximating that of a desired animal from a buoyant core material; and (2) securing a rigid outer skin about the buoyant core body.

The buoyant core body may be formed from a buoyant core material, such as cork, papier-mâché, wood, polystyrene, plastic, or canvas. In a preferred embodiment, the process of forming a buoyant core body includes, for example: (a) filling a decoy mold, or body form, with dense particles of polystyrene; (b) expanding the dense polystyrene particles using a combination of heat and steam to form polystyrene beads; (c) "airing out" the polystyrene beads to substantially displace the methane gas content resulting from the expansion process from the polystyrene beads; and (d) cooling the resulting buoyant core polystyrene body. As will be understood by those of ordinary skill in the art, the heating of polystyrene may produce methane gas. In a process of the present invention the "airing" step is designed to reduce the presence of the methane gas remaining in pores of the polystyrene body. The airing step may be accomplished by allowing the formed body to sit in atmospheric conditions for a period of time sufficient to displace substantially all the methane with ambient air. For an adult duck body, this time period will range from about 12 hours to about 24 hours.

A process of securing a rigid outer skin about the buoyant core body may comprise the following steps: A sheet of deformable material is first heated to its elastic, or collapsing, point. After the sheet of deformable material is heated to its elastic point, the sheet of material is caused to collapse over a buoyant core body, for example, on a vacuum mold. When the buoyant core body is porous, such as when polystyrene is used, suction is then applied through the porous core body. The sheet of heated and collapsed material is preferably vacuum-formed about the buoyant core body by vacuuming out substantially all of the air from underneath the deformed sheet of material. The process of vacuum-forming causes the sheet to adhere tightly about the core body and thus take the shape of the core body. Heating of the pre-formed core body in conjunction with the sheet of material causes the sheet of material and the core body to bond together. Cooling the core body and sheet of material allows the material to anneal, or cure, to further bond to the core body, and to form a rigid outer skin about the core body.

The sheet of deformable material used to form the rigid outer skin may be high impact polystyrene, which is well suited for this application because it is durable, relatively inexpensive, and easy to work with. Those skilled in the art will recognize suitable alternatives, including styrene, acrylic, and acrylonitrile butadiene styrene.

In another aspect a method of the present invention may comprise the steps of forming a buoyant core body in a shape approximating that of a headless desired animal and securing a rigid outer skin about the buoyant core body. The method of the present invention further includes forming a mock head separate from the buoyant core body and securing the mock head to the buoyant core body after the rigid outer skin has been secured about the core body. Forming the buoyant core body without a head provides the advantage of eliminating sharp contours associated with a head, thereby allowing vacuum-forming techniques to effectively be used to apply a rigid outer skin about the buoyant core body. Additionally, the mock head may be formed from excess portions of the sheet of deformable material used to manufacture the rigid outer skin, thereby providing the advantage of eliminating manufacturing waste.

As an example, for one particular embodiment, the steps of this method include: (1) filling a decoy mold, or body form, with dense particles of polystyrene; (2) expanding the dense polystyrene particles using a combination of heat and steam to form polystyrene beads; (3) "airing out" the polystyrene beads to substantially displace the methane gas content from the polystyrene beads resulting from the expansion process; (4) cooling the resulting buoyant core polystyrene body; (5) applying an adhesion promoter to the body; (6) heating a thin sheet of polystyrene to its elastic point; (7) causing the polystyrene sheet to collapse over the polystyrene foam core body on a vacuum mold; (8) applying suction through the porous core body; (9) vacuum-forming the sheet over the body, covering the top, sides, and the outermost 0.75 inches above the circumference of the bottom portion of the core body; (10) heating the pre-formed foam core body in conjunction with the polystyrene sheet; (11) cooling the foam core body and the polystyrene sheet to form a rigid outer skin about the core body; (12) trimming excess portions of the sheet with a hot knife; (13) drilling a hole through the rigid outer skin to receive a head; (14) installing a keel weight in the body or core; and (15) painting the body to emulate a particular species of animal.

In application, the method of the present invention produces an improved hunting decoy having a relatively durable shell or outer skin disposed over a buoyant core. The buoyant core facilitates flotation of the decoy, and the outer skin reduces damage due to inadvertent hits from gun shot. The hunting decoy produced by the method of the present invention is therefore strong and durable with respect to extreme elements of repeated outdoor use, transportation, and storage as well as being hit by gun shot, while maintaining a realistic appearance and flotation characteristics and being relatively simple and inexpensive to manufacture.

DETAILED DESCRIPTION

A method of the present invention, for making an improved realistic, three-dimensional hunting decoy, comprises first forming a buoyant core body in a shape approximating that of a desired animal from a buoyant core material, and then securing a rigid outer skin about the buoyant core body after the buoyant core body has been formed in the desired shape.

In a preferred embodiment, the process of forming a buoyant core body comprises filling a decoy mold, or body form, with dense particles of polystyrene. The dense polystyrene particles are then expanded using a combination of heat and steam to form polystyrene beads. The polystyrene beads are "aired out" in order to substantially displace the methane gas content in the polystyrene beads resulting from the expansion process. The buoyant core polystyrene body made by this method is then cooled. As those skilled in the art will recognize, the buoyant core body may be formed from alternative buoyant core materials, such as cork, papier-mâché, wood, polystyrene, plastic, or canvas.

Figure 1:
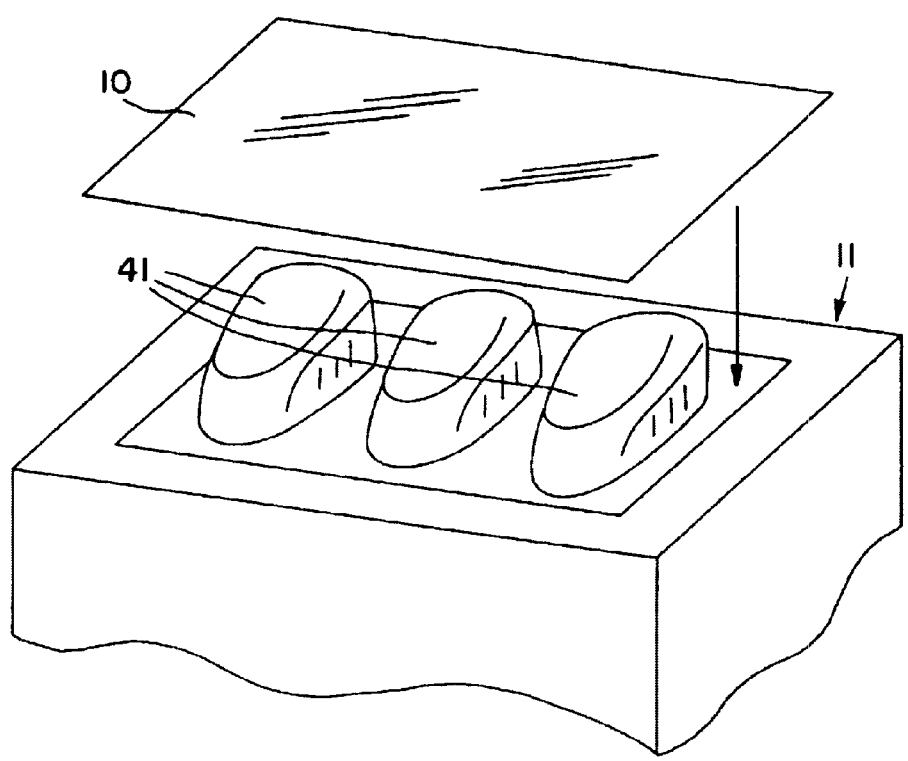
FIG. 1 is a perspective view illustrating representative buoyant core bodies on a vacuum mold to which a sheet of deformable material is applied in the method of making a hunting decoy of the present invention.
Figure 2:
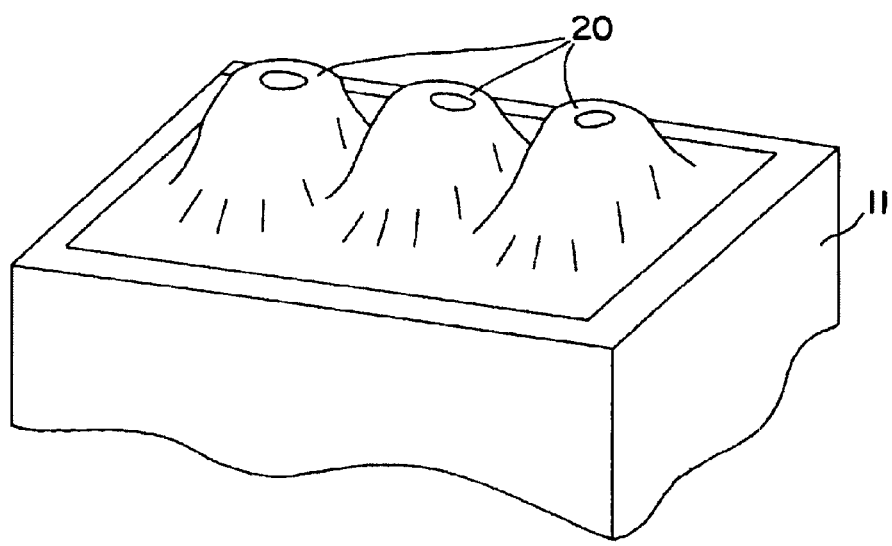
FIG. 2 is a perspective view illustrating a sheet of deformable material in its elastic state as seen collapsing over buoyant core bodies on a vacuum mold.
Figure 3:
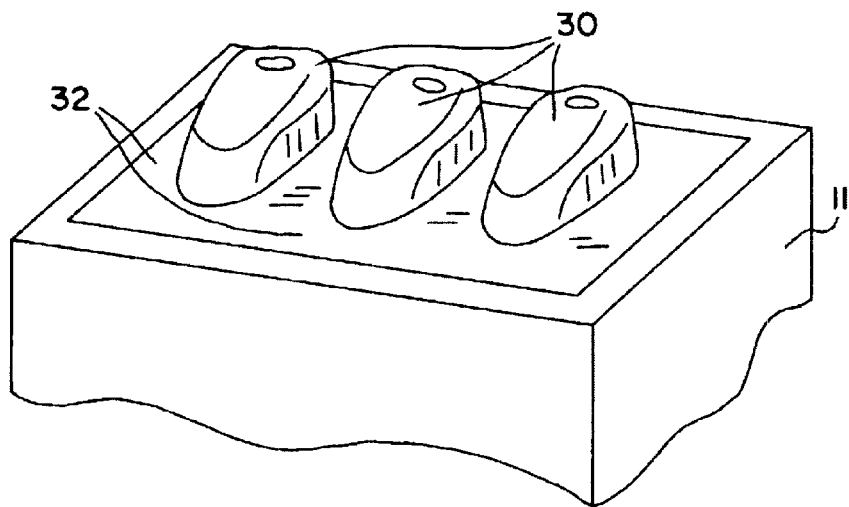
FIG. 3 is a perspective view illustrating a sheet of deformable material secured to buoyant core bodies by vacuum-forming on a vacuum mold.

A preferred embodiment of the method of the present invention is illustrated in FIGS. 1–4. This preferred embodiment utilizes a vacuum mold 11, as illustrated in FIG. 1. Buoyant core bodies 41, having the shape of a desired animal that is the subject of the decoy, are placed upright on top of the vacuum mold 11. The buoyant core bodies 41 used in the method of the present invention are depicted generally in FIGS. 1–3 as a duck. As those skilled in the art will recognize, the method of the present invention may be applicable to other animal configurations as well. The buoyant core bodies may have the shape of virtually any animal, including ducks and geese of all species, turkeys, squirrels, deer, or other animals.

After buoyant core bodies 41 are placed upright on the vacuum mold 11, a rigid outer skin is then secured about the buoyant core bodies 41, comprising the following steps. A sheet of deformable material, depicted as 10 in FIG. 1, is positioned over the buoyant core bodies 41. The sheet of deformable material 10 is heated sufficiently to cause the sheet to soften and reach a point of elasticity without producing any phase change in the sheet. A sheet of polystyrene, for example, would be heated to a temperature of about 200 degrees Fahrenheit for a period of about one minute. Once the sheet of deformable material 10 is heated and softened to the point of elasticity, the sheet is applied to and about the buoyant core bodies 41 by causing the deformed sheet to collapse over and around the buoyant core bodies 41 on vacuum mold 11. The collapsed sheet of material in deformed state is shown as 20 in FIG. 2. The sheet of deformable material 10 used to form the rigid outer skin may be high impact polystyrene, which is well suited for this application because it is durable, relatively inexpensive, and easy to work with. Those skilled in the art will recognize suitable alternatives, including styrene, acrylic, and acrylonitrile butadiene styrene.

In a preferred embodiment, suction is then applied via vacuum mold 11 through the porous core bodies 41. Buoyant core bodies 41 formed, by way of example, from polystyrene are porous and allow application of suction and vacuuming through the core bodies. The sheet of heated and collapsed material is preferably vacuum-formed, shown as 30 in FIG. 3, about the buoyant core bodies 41. Vacuum-forming is accomplished by vacuuming out substantially all of the air from underneath the deformed sheet of material 30 about the core bodies 41 on vacuum mold 11. The process of vacuum-forming causes the sheet 30 to adhere tightly about the core bodies 41 and thus take the shape of the core bodies 41. Heating of the pre-formed core bodies 41 in conjunction with the sheet of material 30 causes the sheet of material 30 and the core bodies 41 to bond together. The sheet of deformable material 30, now re-shaped to the three-dimensional buoyant core bodies 41 approximating that of a desired animal, is cooled. Cooling the core bodies 41 and sheet of material 30 allows the material 30 to anneal, or cure, to further bond to the core bodies 41, and to form a rigid outer skin 42 (FIG. 4) about the core bodies. The cooled and hardened outer skin 42 thus becomes substantially rigid so as to provide enhanced strength and durability to withstand extreme environmental elements of repeated outdoor use, as well as being hit by inadvertent gun shot.

Figure 4:
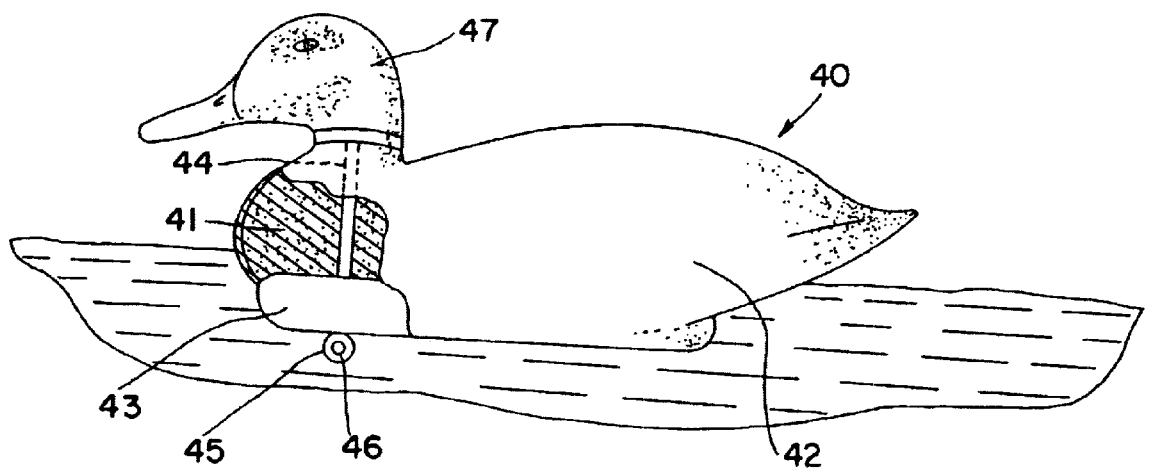
FIG. 4 illustrates one embodiment of a hunting decoy made by the method of the present invention with a partial cross-section showing an eyebolt and keel weight.

Referring to FIG. 4, the method of making an improved hunting decoy of the present invention also comprises the steps of forming a buoyant core body 41 in a shape approximating that of a headless desired animal and securing a rigid outer skin 42 about the buoyant core body 41. The method of the present invention further includes forming a mock head 47 separate from the buoyant core body 41 and securing the mock head 47 to the buoyant core body 41 after the rigid outer skin 42 has been secured about the core body 41. Forming the buoyant core body 41 without a head provides the advantage of eliminating sharp contours associated with a head, thereby allowing vacuum-forming techniques to effectively be used to apply a rigid outer skin 42 about the buoyant core body 41. Additionally, excess portions 32 of the vacuum-formed sheet of material 30 are trimmed from about the core bodies 41. The mock head 47 may be formed from excess portions 32 (FIG. 3) of the sheet of vacuum-formed material 30 used to manufacture the rigid outer skin 42, thereby providing the advantage of eliminating manufacturing waste.

The decoy 40 produced by the method of the present invention includes a core body 41 which is made of a buoyant core material, such as expandable polystyrene, and molded into the shape of a duck's body. A recess is formed in the underside of the core body 41 to receive a keel weight 43 which is made of a material, for example steel, which is relatively heavier than the core body 41. The weight of the keel weight 43 tends to maintain the decoy 40 upright when floating in water. A hole is formed through the core body 41 to receive the shaft 44 of an eyebolt 45. The eyebolt 45 provides a loop 46 beneath the core body 41 to receive a line (not shown) for purposes of "stringing" together decoys across a body of water. A mock duck's head 47 is mounted to an opposite end of the shaft 44. The duck's head 47 is made of, preferably excess portions of the sheet of vacuum-formed material. The eyebolt 45 may be rigidly connected to the keel weight 43 as well. An outer skin 42 is disposed over the top, sides, and part of the bottom, of the core body 41. The outer skin 42 is applied in such a manner that it does not obstruct the recess in the bottom of the core body 41, or otherwise interfere with installation of the keel weight 43 or the duck's head 47.

In order for a decoy to be effective in its use, it must be able to attract like animals. To attract like animals, the decoy must accurately represent the animal to be decoyed. Thus, the outer skin 42 of the improved hunting decoy 40 produced by the method of the present invention will be treated so as to create an accurate likeness of the desired animal. Such likeness may be accomplished by various methods, including painting, attachment of photographs, and the like.

An advantage of the improved decoy made by the method of the present invention is that, because the core body 41 is buoyant, the decoy 40 does not sink when hit by gun shot. Another advantage of the improved decoy produced by the method of the present invention is that, because the outer skin 42 is rigid and contains the buoyant core body 42, it does not disintegrate when hit by gun shot.

From the foregoing description it will be appreciated that the method for making an improved hunting decoy of the present invention has a number of advantages, some of which are described above and others of which are inherent in the invention. More specifically, the present invention provides a method of making an improved hunting decoy that is strong and durable with respect to extreme elements of repeated outdoor use, transportation, and storage as well as being hit by gun shot, is able to maintain a realistic appearance and flotation characteristics, is relatively simple and inexpensive to manufacture, reduces manufacturing waste, and provides ease of access for installing a keel weight or a means for stringing decoys together through a bottom opening.

The foregoing is provided for purposes of explanation and disclosure of a preferred embodiment of the present invention. Modifications of and adaptations to the described embodiment will be apparent to those of ordinary skill in the art of the present invention and may be made without departing from the scope or spirit of the invention and the following claims.

What is claimed is:

1. A method of making an improved decoy, comprising the steps of:
   forming a buoyant core body in a shape approximating that of a desired animal from a porous buoyant core material;
   applying a sheet of deformable material about the buoyant core body;
   heating the buoyant core body and the sheet of deformable material to a temperature where the sheet softens and reaches a point of elasticity without producing any phase change in the sheet; and
   applying suction through the porous buoyant core body to vacuum form the sheet of deformable material about the buoyant core body,
   wherein the sheet of vacuum-formed material forms a rigid outer skin about the buoyant core body.

2. The method of claim 1, further comprising said buoyant core body having a three-dimensional shape, a top surface and side surfaces, and said heating step causing the sheet of deformable material to collapse over and around the top and side surfaces of said buoyant core body and thereby assume a three dimensional configuration.

3. The method of claim 1, further comprising causing the sheet of deformable material heated to said temperature to collapse over the buoyant core body.

4. The method of claim 1, further comprising cooling the buoyant core body and the sheet of deformable material to form the rigid outer skin about the buoyant core body.

5. The method of claim 1, comprising the further steps of forming a mock head, forming a hole through the rigid outer skin and into the buoyant core body for attachment of the mock head, securing one end of a shaft to the mock head, and inserting an opposite end of the shaft into the hole.

6. The method of claim 1, comprising the further steps of forming a recess in an underside of the buoyant core body, and securing an anchor member within the recess.

7. The method of claim 1, wherein the buoyant core body has a top, sides, and a bottom, further comprising securing the outer skin about the top and sides of the buoyant core body.

8. The method of claim 1, further comprising the step of trimming excess portions of the sheet of deformable material after the sheet has been formed about the buoyant core body.

9. The method of claim 8, further comprising the step of using the excess portions of the sheet of deformable material in forming a mock head of the decoy.

10. The method of claim 1, wherein the buoyant core body is formed from a buoyant core material selected from the group consisting of cork, papier-mâché, wood, polystyrene, plastic, and canvas.

11. The method of claim 1, wherein the forming step comprises expanding polystyrene beads within a core body form.

12. The method of claim 11, further comprising the step of substantially displacing methane gas content from the expanded polystyrene beads produced during expansion.

13. The method of claim 11, further comprising the step of cooling the buoyant core body after the polystyrene beads have been expanded and the methane gas content displaced.

14. The method of claim 11, wherein applying a sheet of deformable material about the buoyant core body comprises applying a polystyrene sheet about the buoyant core body.

15. The method of claim 1, wherein the outer skin is formed from a material selected from the group consisting of acrylic, styrene, polystyrene, and acrylonitrile butadiene styrene.

16. The method of claim 1, wherein applying a sheet of deformable material about the buoyant core body comprises applying a polystyrene sheet about the buoyant core body.

17. A method of making an improved decoy, comprising the steps of:
   forming a buoyant core body in a shape approximating that of a headless desired animal from a porous buoyant core material;
   heating a sheet of deformable material to a temperature where the sheet softens and reaches a point of elasticity without producing any phase change in said sheet;
   causing the sheet of deformable material heated to said temperature to collapse over the buoyant core body;
   heating the buoyant core body in conjunction with the heated sheet of deformable material;
   applying suction through the porous buoyant core body to vacuum-form the sheet of deformable material about the buoyant core body, wherein the sheet of vacuum-formed material forms a rigid outer skin about the buoyant core body; and
   securing a mock head to the buoyant core body.

18. The method of claim 17, wherein the desired animal comprises a water fowl.

19. The method of claim 17, wherein the buoyant core body has a top, sides, and a bottom, and the vacuum-forming step comprises securing the sheet of deformable material about the top and sides of the buoyant core body.

20. The method of claim 19, further comprising the steps of trimming excess portions of the sheet of deformable material after the sheet of deformable material has been formed about the buoyant core body, and using the excess portions of the sheet of deformable material in forming a mock head of the decoy.

21. The method of claim 20, wherein the vacuum-forming step further comprises forming a polystyrene sheet about the buoyant core body.

22. A method of making a decoy, comprising the steps of:
   expanding polystyrene beads within a core body form having a shape approximating that of a desired animal to form a buoyant core body;
   cooling the buoyant core body;
   heating a sheet of deformable material to a temperature where the sheet softens and reaches a point of elasticity without producing any phase change in said sheet;
   causing the sheet of deformable material heated to said temperature to collapse over the buoyant core body;
   heating the buoyant core body and the sheet of deformable material together;
   applying suction through the porous buoyant core body to vacuum-form the sheet of deformable material about the buoyant core body; and
   cooling the buoyant core body and the sheet of deformable material,
   wherein the sheet of vacuum-formed material forms a rigid outer skin about the buoyant core body.

23. The method of claim 22, further comprising forming a mock head, forming a hole through the rigid outer skin and into the buoyant core body for attachment of the mock head, securing one end of a shaft to the mock head, and inserting an opposite end of the shaft into the hole.

24. The method of claim 22, further comprising forming a recess in an underside of the buoyant core body, and securing an anchor member within the recess.

25. The method of claim 22, wherein the outer skin comprises polystyrene.

* * * * *